United States Patent [19]
Smith

[11] 3,831,135
[45] Aug. 20, 1974

[54] OPTICAL IMAGING OF SOUND FIELDS BY HETERODYNING

[75] Inventor: Roy A. Smith, Redondo Beach, Calif.

[73] Assignee: TRW Inc., Redondo Beach, Calif.

[22] Filed: Sept. 10, 1973

[21] Appl. No.: 395,490

[52] U.S. Cl............ 340/3 R, 73/67.7, 178/DIG. 18, 340/5 MP
[51] Int. Cl............................ G01s 9/66, G01s 7/56
[58] Field of Search......... 340/1 R, 3 R, 5 MP, 5 H; 73/67.7; 178/DIG. 18

[56] References Cited
UNITED STATES PATENTS
3,685,008  8/1972  Bhuta et al.......................... 340/3 R

OTHER PUBLICATIONS
Acoustical Holography, Vol. 3, Plenum Press, 1971, pp. 47–70.

Primary Examiner—Richard A. Farley
Attorney, Agent, or Firm—Daniel T. Anderson; Donald R. Nyhagen; Edwin A. Oser

[57] ABSTRACT

Bragg imaging at relatively low acoustic imaging frequencies is accomplished by Bragg diffracting light-beam lightbeam in such a way that the diffracted light from the Bragg light-sound interaction region includes an image sideband of one order or frequency and a relatively uniform field of reference light of another order or frequency which is superimposed on the image sideband at the image plane of the sideband image. The image sideband light heterodynes with the reference light to replicate the sideband image as a signal whose frequency is the beat frequency of the sideband and reference lights. The replicate heterodyne image is detected with a photodetector tuned to the beat frequency and electrically converted to an image display.

The invention herein described was made in the course of or under a contract or subcontract thereunder the Department of Defense.

10 Claims, 11 Drawing Figures

OPTICAL IMAGING OF SOUND FIELDS BY HETERODYNING

BACKGROUND OF THE INVENTION

1. Field of the Invention

This invention relates generally to Bragg imaging and more particularly to an improved Bragg imaging method and apparatus utilizing heterodyne Bragg image detection and electronic image display for imaging at relatively low acoustic frequencies at which the noise level precludes direct viewing of the Bragg image.

2. Prior Art

The basic technique of Bragg imaging is wellknown and described in many prior art publications including U.S. Pat. Nos. 3,626,753 and 3,685,008. Simply stated, this imaging technique involves acoustic illumination of an object to produce an acoustic field containing image information concerning the object and Bragg diffraction of a monochromatic lightbeam by the field within the lightsound interaction region of a Bragg cell. The resulting interaction of the beam light and acoustic field occurs in such a way that the light emerging from the acoustic field consists of central order light of the same frequency as the beam source and light sidebands of various orders each having a frequency equal to the central order light frequency plus or minus, as the case may be, a multiple of the acoustic wave frequency. Each sideband forms an optical image of the object. Under certain conditions, as explained below, the image formed by one side band, generally a first order sideband, may be enlarged for direct viewing or otherwise converted to a visual display of the object.

This technique of Bragg imaging has been developed to such an extent that it is now possible to produce images with resolution and detail comparing favorably with those attained by other acoustic imaging methods. Moreover, Bragg imaging may be utilized to image objects by either acoustic wave transmission through or acoustic wave reflection from the objects. In the transmission mode, acoustic waves propagate from an acoustic source, through the object to be imaged, to the light-sound interaction region of the Bragg cell. In the reflection mode, the acoustic waves from the acoustic source propagate to the object and are then reflected from the object to the light-sound interaction region of the Bragg cell. In each case, the acoustic waves incident on the object are scattered or distorted in such a way that the waves arriving at the light-sound interaction region are distorted waves containing information representing an acoustic image of the object.

The basic or conventional Bragg imaging technique described above has an inherent disadvantage with which this invention is concerned. This disadvantage resides in the fact that the lowest acoustic imaging frequency which can be utilized is relatively high, i.e. on the order of several megahertz, compared to the acoustic frequencies required for certain imaging application, as discussed below, and results from two inherent characterisitcs of Bragg imaging. One of these characteristics is that the angular separation between the central order light and first order image sidebands produced by Bragg diffraction is proportional to the acoustic imaging frequency. The other characteristic is that the Bragg imaging process has several sources of image noise including inhomogeneous effects in the Bragg medium due to fluid streaming, thermal gradients, and turbulence, Tyndale scattering, Rayleigh scattering, and Brillion scattering.

These two characteristics, angular separation proportional to acoustic frequency and noise, limit the lowest acoustic imaging frequencies to several megahertz for the reasons that at lower acoustic frequencies, it is impossible to isolate a first order light sideband from the central order light for direct vieweing of the sideband image. Thus, at such lower frequencies, the noise level compared to the central order/sideband light separation becomes such that the central order light effectively "spills over" onto the first order sidebands, thereby obscuring the sideband images.

This limitation of the lowest acoustic frequency which can be used for direct viewing Bragg imaging excludes conventional Bragg imaging systems from many useful applications in which lower frequencies are either highly desirable or absolutely essential. Two examples of such useful excluded applications are those which involve imaging of objects, such as biological specimens, whose sound absorption at the high direct viewing frequencies is too high for efficient imaging and those which involve echo imaging, in the manner described in U.S. Pat. No. 3,685,008, of distant objects immersed in water or other sound wave transmission media that cause excessive attenuation of the direct viewing frequencies.

Various techniques have been proposed to avoid the above described disadvantage of conventional direct viewing Bragg imaging systems. One of these techniques is described in Chapter 4, Vol. 3 of the text entitled "Acoustical Holography", published by Plenum Press, New York and London, in an article entitled "Optical Heterodyne Detection In Bragg Imaging", starting at page 47. Simply stated, this technique involves splitting the Bragg cell illumination light-beam into two separate beams, namely, an imaging beam and a heterodyne reference lightbeam. An object is imaged by Bragg diffraction of the imaging beam in the usual way to produce a light sideband forming an image of the object. The reference beam is directed around the Bragg cell and superimposed on the sideband image.

The sideband image light and reference light have different orders or frequencies, such that the image light heterodynes with the reference light to replicate the sideband image as a heterodyne signal whose frequency is the beat frequency of the sideband and reference lights. This heterodyne image is detected with a photosensor responsive only to the heterodyne image frequency and converted electronically to an image display of the object. This heterodyne Bragg imaging technique is capable of forming images at relatively low acoustic frequencies, well below those required for direct viewing Bragg imaging, at which background noise actually obscures the normal Bragg sideband image by spill over of the central order light onto the image sideband.

While the described Bragg heterodyne image detection system permits Bragg imaging at relatively low acoustic frequencies suitable for the excluded applications mentioned earlier and other low frequency applications, it has certain inherent disadvantages. The foremost of these is that only poor images can be obtained. Additionally, it requires a reference beam directed around the Bragg cell, which may be inconvenient or impossible in some applications, and costly optics to accomplish such reference beam direction around the cell.

SUMMARY OF THE INVENTION

This invention provides an improved optical heterodyne detection Bragg imaging system which avoids the foregoing disadvantages of the existing Bragg imaging systems of this kind while preserving their imaging capability at relatively low acoustic frequencies. According to the invention, a monochromatic light-beam is Bragg diffracted by an acoustic field containing image information concerning an object in such a way that the light emerging from the Bragg light-sound interaction region of the Bragg cell includes a light sideband of one frequency or order forming an image of the object and a relatively uniform reference light field of another frequency or order which is superimposed on the image sideband at the image plane of the sideband. THe sideband image light heterodynes with the reference light to replicate the image as a heterodyne signal, referred to herein as a heterodyne image, as having a frequency equal to the beat frequency of the image sideband light and reference light.

This heterodyne signal or image is detected with a photosensor which is responsive only to the beat signal frequency and produces an electrical output proportional to the light intensity at various points of the image. The photosensor output is electronically converted to an image display of the object. Image detection may be accomplished by scanning the image plane with a photosensitive element or by receiving the heterodyne image on an array of photosensitive elements.

According to the invention, the reference light field from the Bragg light-sound interaction region may be provided in various ways. For example, the reference light may be central order light which spills over onto the image sideband. Alternatively, the reference light field may be an image of the acoustic source or transducer which generates the acoustic field for illuminating the object to be imaged or an image of a reference acoustic source or transducer of different frequency than the acoustic source which acoustically illuminates the object.

DESCRIPTION OF THE PREFERRED EMBODIMENTS

Figures 1, 2:
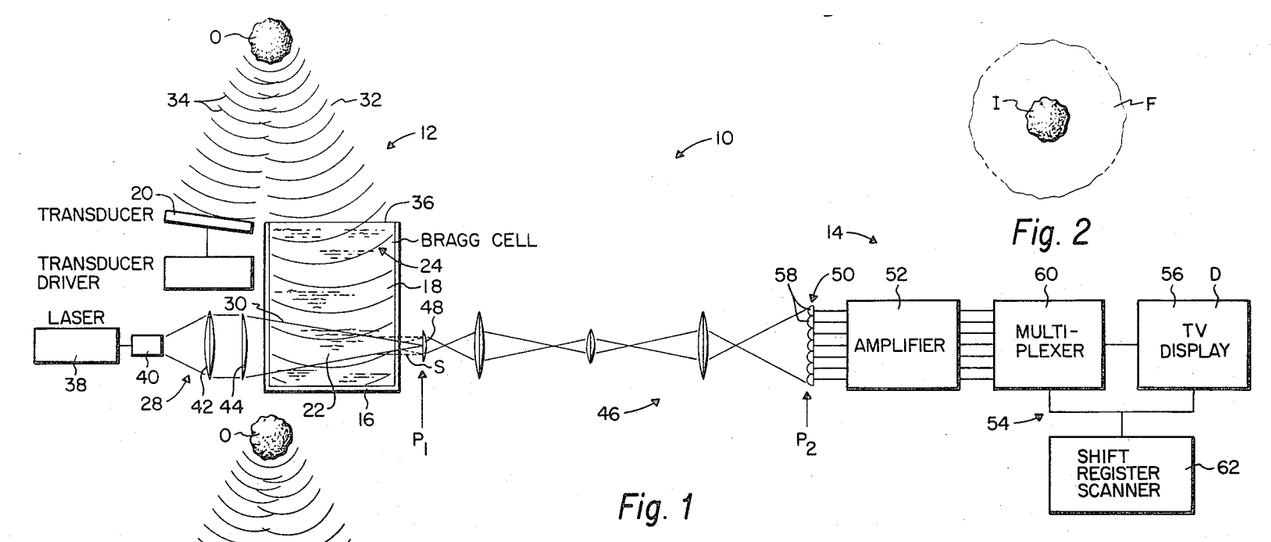
FIG. 1 illustrates a Bragg imaging system according to the invention.
FIG. 2 illustrates a Bragg image and heterodyne reference light field produced by the imaging system of FIG. 1.

The Bragg imaging system 10 of the invention illustrated in FIG. 1 comprises Bragg imaging means 12 and heterodyne image detection and image display means 14. As will be explained in detail later, the Bragg imaging means 12 operates to produce, By Bragg diffraction, an image light sideband S forming a Bragg image I of an object O and a relatively uniform field F of reference light of different order or frequency than the image sideband light which is superimposed on the image sideband at the Bragg image plane. The sideband light heterodynes with the reference field light to replicate the Bragg image as a heterodyne signal having a frequency equal to the beat frequency of the sideband and reference light. This signal produced by optical heterodyning is referred to herein as a heterodyne image. The heterodyne image detection and image display means 14 detects this heterodyne image and electronically converts the latter to an image display D of the object.

The Bragg imaging means 12 includes a Bragg cell 16 containing an optically transparent acoustic wave transmission medium 18, an acoustic source or transducer 20 for producing within a light-sound interaction region 22 of the medium an acoustic field 24 containing image information concerning the object O to be imaged, and means 28 for projecting a substantially monochromatic lightbeam 30 through the interaction region, transverse to the direction of propagation of the acoustic field through the region. As noted earlier and described in the earlier mentioned patents, Bragg imaging may be accomplished by either acoustic wave transmission through or reflection from an object. Also an object to be imaged may be located directly within the Bragg cell or outside the cell in such a way that the object is acoustically coupled to a Bragg medium within the cell.

The particular inventive embodiment illustrated is an underwater Bragg echo imaging system in which the object O to be imaged is located in a body of water 32 some distance from the Bragg imaging system 10. The acoustic transducer 20 and Bragg cell 16 are acoustically coupled to the water 32 in such a way that acoustic waves 34 are transmitted through the water from the transducer to the object and are then reflected by the object back through the water to one wall 36 of the Bragg cell. This cell wall comprises an acoustic wave transmission membrane or the like which transmits the incident reflected waves to the Bragg medium 18. The reflected waves thus transmitted to the Bragg medium comprise distorted acoustic waves which contain image information concerning the object O and provide the acoustic field 24 within the medium.

The light beam projecting means 28 comprises a substantially monochromatic light source 38, such as a laser, and a lens system including a diverging lens 40, a collimating lens 42, and a converging lens 44. This lens system forms the light from the light-source 38 into a converging beam 30 which passes through the Bragg cell 16 and intercepts the reflected distorted acoustic waves from the object O at the Bragg angle within the light-sound interaction region 22. The light-beam is thereby Bragg diffracted by the acoustic waves in a manner such that the light emerging from the interaction region comprises central order light of the same frequency as the beam source 38 and diffracted light sidesbands of differing order or frequency each forming, at the Bragg image plane $P_1$, an image of the object O. Each image sideband has a light frequency equal to the central order light frequency plus or minus, depending upon whether the sideband is up-converted or down-converted, a multiple (i.e. the sideband order) of the central order light frequency. One first order sideband, designated as sideband S, is selected for heterodyne image detection.

The diffracted light from the Bragg light-sound interaction region 22 passes through magnifying and imaging optics 46 which magnifies the Bragg image of the selected image sideband S and focuses the image at an image detection plane $P_2$. The enlarged image at the plane $P_2$ is designated I. At this point, it should be noted that the Bragg sideband images formed at the Bragg image plane $P_1$ are anamorphic in the sense that their magnification in a direction parallel to the direction of acoustic wave propagation through the Bragg cell 16 is too small relative to their magnification in the orthognal direction. Optics 46 includes a cylindrical lens 48 for magnifying the selected Bragg sideband image in a direction parallel to the wave propagation direction only to provide at the image detection plane $P_2$ a uniformly magnified or orthoscopic sideband image I.

As mentioned earlier, the angular separation between the central order light and the first order image sidebands is proportional to the acoustic imaging frequency, that is the frequency of the acoustic waves 34 from the acoustic source 20. In the particular inventive embodiment being described, this acoustic imaging frequency is made relatively low to reduce the attenuation of the acoustic waves 34 in the water 32 to a level at which the object O may be Bragg imaged by underwater sound reflection, as described. At this low imaging frequency, the angular separation between the central order light and first order image sidebands is so small that the central order light spills over onto the first order sidebands so as to be superimposed on these sidebands at the Bragg image plane $P_1$. This central spill over light provides the reference light field F which is superimposed on the image sideband S at the image detection plane $P_2$.

The central order light of the reference light field F has the same frequency as the light-beam source 38. The image sideband S has a frequency differing from the central order light frequency by the frequency of the acoustic source 20. Accordingly, the light of the image sideband S heterodynes with the reference light to replicate the Bragg image I as a heterodyne signal or image with a frequency equal to the beat frequency of the image sideband and reference field light. This can occur under conditions where neither the Bragg image I nor the heterodyne image can be viewed directly.

The heterodyne image is detected and converted to a visual image by the image detection and display means 14. Means 14 comprises photodetector means 50 located at the image detection plane $P_2$ to receive the heterodyne image, narrow band amplifier means 52 coupled to the output of the photodetector means and tuned to the light frequency of the heterodyne image, i.e. the beat frequency of the image sideband S and reference light F, means 54 for effectively scanning the image plane by the photodetector means, such that the output of the amplifier means varies in accordance with the varying heterodyne image intensity over the image plane, and means 56 for converting the amplifier output to a corresponding visual image display. In the particular inventive embodiment shown, the photodetector means comprises an integrated circuit array of photosensors 58 arranged in a rectangular matrix over the entire image detection plane $P_2$. The amplifier means 52 preferably comprises a separate narrow band amplifier channel for each photosensor, each tuned to the heterodyne image frequency. Scanning means 54 comprises a multiplexer 60 connected to the outputs of the several narrow band amplifiers and to a shift register scanner 62 which actuates the multiplex to scan the amplifier outputs and feed these outputs in sequence to the multiplexer output. Finally, image display means 56 comprises a video tube display which is connected to the multiplexer output and to the shift register scanner 62 in such a way that the electron beam of the tube is scanned in unison with scanning of the photosensors 58 and the beam intensity is modulated in accordance with the photosensor outputs to replicate the heterodyne image on the video tube screen.

Figure 3:
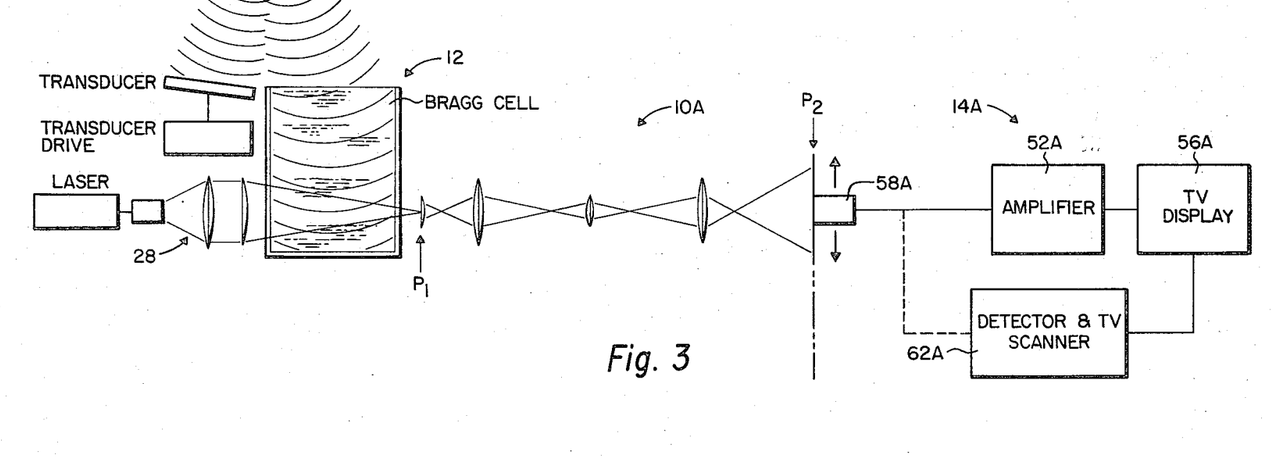
FIG. 3 illustrates a modified Bragg imaging system.

FIG. 3 illustrates an alternative heterodyne image detection and display means 14A which may be used in place of means 14 of FIG. 1. Means 14A comprises a single photosensor 58A which is movable in a scanning motion over the image detection plane $P_2$. This photosensor is connected to a video tube display 56A through a narrow band amplifier 52A tuned to the heterodyne image frequency so as to modulate the electron beam intensity of the tube in accordance with the varying intensity of the heterodyne image scanned by the photosensor. Scanning means 62A are connected to the photosensor and to the video tube display to drive the photosensor in its scanning motion over the image plane and scan the video tube electron beam in unison with the photosensor so as to replicate the heterodyne image on the video tube screen.

As noted earlier, the reference light field F in the Bragg imaging system 10 described above is formed by the central order light which spills over onto the image sideband S. This spill over light may not be sufficiently uniform over the image plane P to provide effective heterodyne image formation. FIGS. 4 through 7 illustrated two modified Bragg imaging systems 10B and 10C according to the invention which provide a more uniform reference light field.

Figure 4:
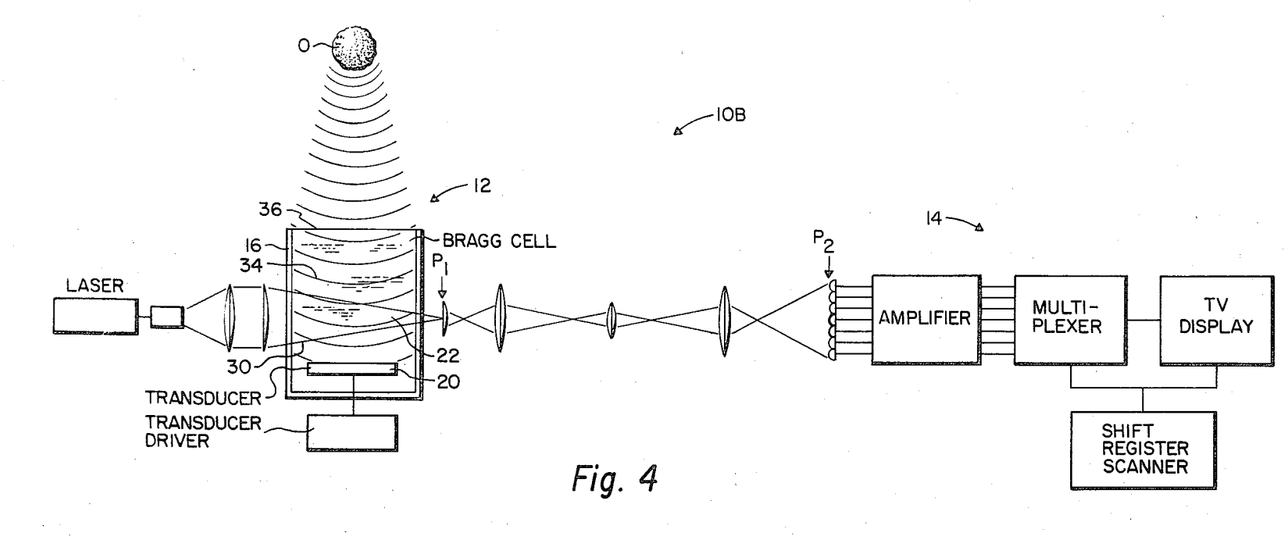
FIG. 4 illustrates a further modified Bragg imaging system.
Figure 5:
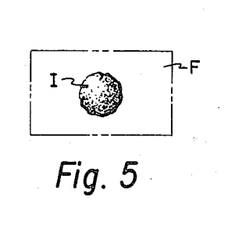
FIG. 5 illustrates a Bragg image and reference light field produced by the imaging system of FIG. 4.

In the imaging system 10B of FIGS. 4, 5, the acoustic source or transducer 20 is located within the Bragg cell 16 in sucn a way that the acoustic waves 34 from the source propagate through the light-sound interaction region 22 and cell membrane 36 to the object O and are then reflected back to the interaction region, as before. The remainder of the imaging system is identical to the imaging system 10.

During operation of the Bragg imaging system 10B, the light-beam 30 is Bragg diffracted by the reflected acoustic waves from the object O to produce image sidebands each forming an image of the object. The light-beam is also Bragg diffracted by the outgoing acoustic waves propagating from the acoustic source 20, through the beam, to the object O. Bragg diffraction of the beam by these latter outgoing waves produces additional light sidebands each forming an image of the acoustic source or transducer. These transducer images comprise generally uniform light fields having the same outline shape as the transducer. Since the outgoing acoustic waves which produce the transducer image sidebands and the reflected acoutstic waves which produce the object image sidebands propagate in opposite directions through the light-beam, the positions, relative to the light-beam axis, of the up-converted and down-converted transudcer and object image sidebands are reversed; that is to say, the up-converted transducer image sidebands and down-converted object image sidebands lie at one side of the beam axis and the down-converted transducer image sidebands and up-converted object image sidebands lie at the opposite side of the beam axis.

According to this invention, one of the first order object image sidebands, i.e. sideband S which is assumed to be the up-converted first order sideband, is selected for heterodyne image detection. The transducer 20 is located in a position such that the first order down-converted transducer image sideband is superimposed, at the Bragg image plane $P_1$, on the object image sideband S to provide at the image detection plane $P_2$ a relatively uniform field F of reference light which is superimposed on the image I of the object O at the latter plane. The image sideband light and the reference light differ in frequency by twice the frequency of the acoustic source 20. Accordingly, the image sideband light heterodynes with the reference light to replicate the object image I with light having a frequency equal to the beat frequency of the sideband and reference lights. The resulting replicate or heterodyne image is detected and converted to a visual image display by the image detection and display means 14, as before.

The imaging system just described is subject to the limitation that any non-linearities which occur as the imaging sound level is increased may produce second harmonics in the diffracted light which obscure the object image. The imaging system 10C of FIGS. 6 and 7 avoids this limitation.

Figures 6, 8, 9:
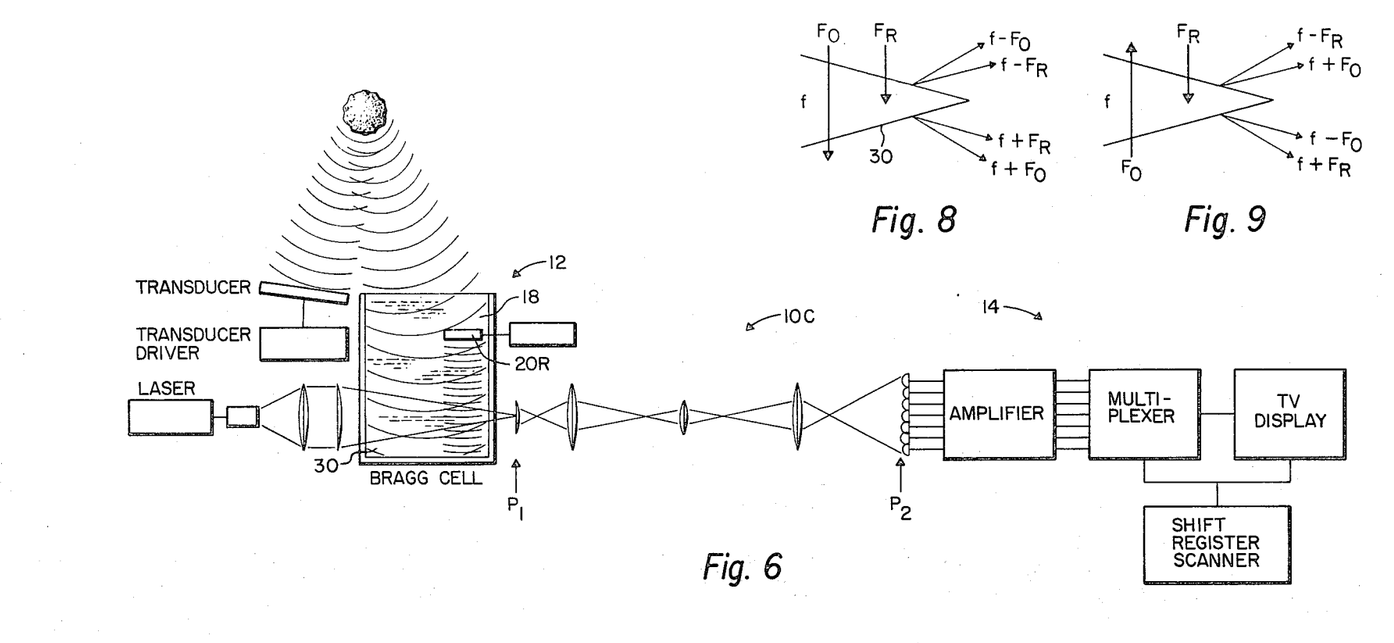
FIG. 6 illustrates a double frequency Bragg imaging system.
FIGS. 8 and 9 illustrate a sound direction discriminating action of the double frequency system.
Figure 7:
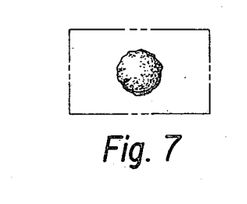
FIG. 7 illustrates a Bragg image and reference light field produced by the imaging system of FIG. 6.

Imaging system 10C is a double frequency imaging system which includes, in addition to the acoustic source or transducer 20 for acoustically illuminating the object O to be imaged, a reference field acoustic source or transducer 20R for producing the reference light field which heterodynes with the object image sideband light to form the heterodyne image. This reference field transducer may be driven at a much lower power level than the object illumination transducer 20. The particular double frequency imaging system shown has the same basic configuration as and, except for the reference field transducer, is identical to the imaging system 10. The reference field transducer is driven at a different frequency than the object illumination transducer 20 to produce in the Bragg medium 18 a reference acoustic field which Bragg diffracts the light-beam 30 in addition to Bragg diffraction of the beam by the reflected distorted acoustic waves from the object O to be imaged. The reference transducer 20R is so located that one first order image sideband produced by such reference field Bragg diffraction of the light-beam is superimposed on the object image sideband S at the Bragg image plane $P_1$ to provide at the image detection plane $P_2$ a relatively uniform field F of reference light, comprising an image of the reference transducer, which is superimposed on the object image I. The light of the object image sideband and the reference light produced by the reference transducer differ in frequency, and accordingly, the object image sideband light heterodynes with the reference light to replicate the image I as a heterodyning image signal having a frequency equal to the beat frequency of the sideband and reference lights. The heterodyne image is detected and converted to a visual display by the image detection and display means 14.

As noted earlier, one advantage of the invention is its ability to image objects by Bragg diffraction at relatively low acoustic imaging frequencies, suitable for imaging biological specimens, underwater echo imaging, and other applications requiring relatively low object illumination frequencies. By way of example, it is believed that the invention may be utilized to image submerged objects at a range on the order of 100 meters with imaging frequencies on the order of 250 KHz. In the double frequency imaging system of FIGS. 6 and 7, the frequencies of the reference field and object illumination transducers 20, 20R may be on the order of 100 KHz without difficulty.

Another advantage of the invention resides in the fact that none of the present Bragg imaging systems is responsive to extraneous sound of a frequency differing from that used to acoustically illuminate the object being imaged. This is due, of course, to the fact that the heterodyne image detection amplifier is tuned to amplify only the heterodyne image signal frequency. The double frequency imaging system of FIG. 6 possesses the additional advantage that it is unresponsive even to sound of the object illumination frequency except incoming illumination sound from the object. In other words, the double frequency system discriminates between incoming imaging sound from the object being imaged and sound of the same frequency passing through the Bragg cell in the opposite direction to the incoming sound.

FIGS. 8 and 9 illustrate this discriminating action of the double frequency system. In FIG. 8, the light-beam 30, of light frequency $f$, is Bragg diffracted by object illumination sound waves of frequency $F_o$ from the object being imaged to produce up-converted and down-converted first order image sidebands $f+F_o$ and $f-F_o$. The beam is also Bragg diffracted by sound waves of frequency $F_R$ from the reference transducer 20R to produce up-converted and down-converted first order sidebands $f+F_R$ and $f-F_R$. In this case, the heterodyne signal frequencies are the same for both the up-converted and downconverted sidebands, i.e. $(f+F_R)-(f+F_o) = F_R-F_o$ for the up-converted sidebands and $(f-F_R)-(f-F_o) = F_o-F_R$ for the down-converted sidebands. The heterodyne image detection amplifier is tuned to this signal frequency.

Consider now sound of the object illumination frequency $F_o$ passing in the opposite direction through the light-beam, as shown in FIG. 9. In this case, the heterodyne signal frequencies are again equal, i.e. $(f+F_R)-(f-F_o) = F_R+F_o$ and $(f-F_R)-(f+F_o) = -F_R-F_o$. However, this latter signal frequency differs from that for which the image detection amplifier is tuned. Accordingly, the double frequency imaging system is not responsive to sound of the object illumination frequency passing through the light-beam in the opposite direction to the incoming sound from the object. The same result would be obtained, of course, with the reference transducer on the opposite side of the light-beam from the object.

Figure 10:
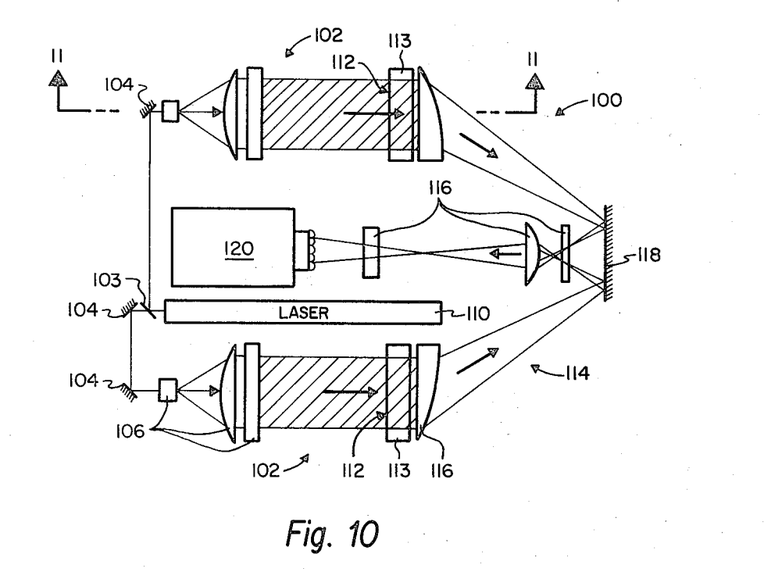
FIG. 10 illustrates a shaded aperature imaging system according to the invention.
Figure 11:
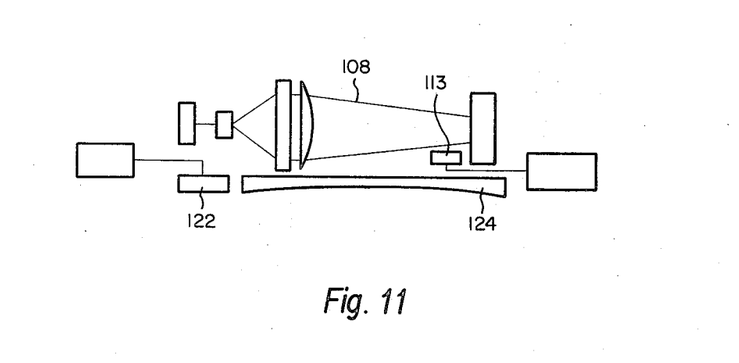
FIG. 11 is a section taken on line 11—11 in FIG. 10.

FIGS. 10 and 11 illustrate a shaded aperature double frequency underwater Bragg imaging system 100. Imaging system 100 comprises two parallel Bragg imaging systems 102 including a beam splitter 103, mirrors 104, and lenses 106 for directing convergent light-beams 108 from a common laser source 110 through two separate Bragg cells 112, each containing a reference transducer 113, and magnifying and imaging optics 114 including lenses 116 and a mirror 118 for directing the light from the Bragg cells to a common image detection and image display means 120. An acoustic source or transducer 122 is provided for acoustically illuminating a distant submerged object. Opposite each Bragg cell 112 is an acoustic lens 124 for focussing reflected acoustic waves from the object in the light-sound interaction region of the adjacent cell.

Each Bragg imaging system 102 operates to image the object and a reference light field on the photosensor array of the image detection and display means 120, and the latter means produces an image display of the object in the same manner as the imaging system of FIG. 6. Obviously, the imaging system of FIG. 10 could be used also for conventional Bragg imaging.

I claim:

1. The method of Bragg imaging an object, comprising the steps of:
   projecting a beam of light from a substantially monochromatic light-source through an optically transparent acoustic wave transmission medium;
   establishing in said medium an acoustic field comprising distorted acoustic waves containing information representing an acoustic image of the object which produces Bragg diffraction of said beam in a manner such that the light emerging from said field comprises light of one sideband order forming an optical image of said object and light of another order forming a relatively uniform light field which is superimposed on and heterodyned with said sideband light at the image plane of said optical image, whereby said optical image is replicated as a heterodyne signal with a frequency equal to the beat frequency of said light orders;
   sensing and producing an electrical output proportional to the intensity of light of said beat frequency at different points of the image plane of the heterodyne image; and
   converting said electrical output to a visual image display of said object.

2. The method according to claim 1 wherein:
   said other order light is central order light of the same frequency as said light source.

3. The method according to claim 1 wherein:
   said other order light is light of a sideband order.

4. The method according to claim 1 wherein:
   said acoustc field is established by effecting propagation of acoustic waves from an acoustic source of given frequency to said object and then from said object through said medium in a manner such that the waves propagating from said object comprise said distorted acoustic waves which produce Bragg diffraction of said lightbeam to create said light of one sideband order forming said optical image of said object, and effecting propagation of acoustic waves from said acoustic source directly through said medium to produce Bragg diffraction of said beam in such a way as to create a light sideband of another order forming an optical image of said acoustic source which comprises said uniform light field.

5. The method according to claim 1 wherein:
   said acoustic field is established by effecting propagation of acoustic waves from a first acoustic source of given frequency to said object and then from said object through said medium in a manner such that the waves propagating from said object comprise said distorted acoustic waves which produce Bragg diffraction of said light-beam to create said light of one sideband order forming said otpical image of said object, and effecting propagation of acoustic waves from a second acoustic source of different frequency directly through said medium to produce Bragg diffraction of said beam in such a way as to create a light sideband of another order forming an optical image of said second acoustic source which comprises said uniform light field.

6. Bragg imaging apparatus for imaging an object comprising:
   a Bragg cell containing an optically transparent acoustic wave transmission medium;
   substantially monochromatic light source;
   means for projecting a light-beam from said source through said medium;
   means for establishing in said medium an acoustic field comprising distorted acoustic waves containing information representing an acoustic image of the object which produces Bragg diffraction of said beam in a manner such that the light emerging from said field comprises light of one sideband order forming an optical image of said object and light of another order forming a relatively uniform light field which is superimposed on and heterodyned with said sideband light at the image plane of said optical image, whereby said optical image is replicated as a heterodyne signal at a frequency equal to the beat frequency of said light orders;
   means for sensing and producing an electrical output proportional to the intensity of light of said beat frequency at different points of the image plane of the heterodyne image; and
   means for converting said electrical output to a visual image display of said object.

7. The apparatus according to claim 6 wherein:
   said other order light is central order light of the same frequency as said light source.

8. The apparatus according to claim 6 wherein:
   said other order light is light of a sideband order.

9. Apparatus according to claim 6 wherein:
   said acoustic field establishing means comprising an acoustic source of given frequency for effecting propagation of acoustic waves from said acoustic source to said object and then from said object through said medium in a manner such that the waves propagating from said object comprise said distorted acoustic waves which produce Bragg diffraction of said light-beam to create said light of one sideband order forming said optical image of said object, and effecting propagation of acoustic waves from said acoustic source directly through said medium to produce Bragg diffraction of said beam in such a way as to create a light sideband of another order forming an optical image of said acoustic source which comprises said uniform light field.

10. Apparatus according to claim 6 wherein:
    said acoustic field establishing means comprises a first acoustic source of given frequency for effecting propagation of acoustic waves from said acoustic source to said object and then from said object through said medium in a manner such that the waves propagating from said object comprise said distorted acoustic waves which produce Bragg diffraction of said lightbeam to create said light of one sideband order forming said optical image of said object, and a second acoustic source of different frequency for effecting propagation of acoustic waves from said second acoustic source directly through said medium to produce Bragg diffraction of said beam in such a way as to create a light sideband of another order forming an optical image of said second acoustic source which comprises said uniform light field.

* * * * *